United States Patent
Ziegler et al.

(10) Patent No.: US 11,636,245 B2
(45) Date of Patent: *Apr. 25, 2023

(54) METHODS AND SYSTEMS FOR LEVERAGING COMPUTER-AIDED DESIGN VARIABILITY IN SYNTHESIS TUNING

(71) Applicant: INTERNATIONAL BUSINESS MACHINES CORPORATION, Armonk, NY (US)

(72) Inventors: Matthew Mantell Ziegler, Yorktown Heights, NY (US); Lakshmi N. Reddy, Yorktown Heights, NY (US); Robert Louis Franch, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 9 days.

This patent is subject to a terminal disclaimer.

(21) Appl. No.: 17/444,860

(22) Filed: Aug. 11, 2021

(65) Prior Publication Data
US 2023/0046893 A1    Feb. 16, 2023

(51) Int. Cl.
*G06F 30/30*    (2020.01)
*G06F 30/337*    (2020.01)
(Continued)

(52) U.S. Cl.
CPC .......... *G06F 30/337* (2020.01); *G06F 30/327* (2020.01); *G06F 30/33* (2020.01)

(58) Field of Classification Search
None
See application file for complete search history.

(56) References Cited

U.S. PATENT DOCUMENTS 7,370,295 B1 *   5/2008   Chesal .................... G06F 30/34
                                                                716/135
7,669,150 B2      2/2010   Li
(Continued)

FOREIGN PATENT DOCUMENTS

WO    2006017247 A3    3/2007

OTHER PUBLICATIONS

M. Cho et al., "LatchPlanner: Latch Placement Algorithm for Datapath-oriented High-Performance VLSI Designs," 2013 IEEE, pp. 342-348. (Year: 2013).*

(Continued)

*Primary Examiner* — Leigh M Garbowski
(74) *Attorney, Agent, or Firm* — Griffiths & Seaton PLLC

(57) ABSTRACT

Embodiments for tuning parameters to a synthesis program are provided. At least one set of parameter settings for the synthesis program is selected. A plurality of identical synthesis jobs for the at least one set of parameter settings is run in an iteration of the synthesis program. Results of the iteration of the synthesis program are analyzed utilizing a tuning optimization cost function. Combinations of the parameter settings are created based on the analysis. At least one synthesis job for is run each of the combinations of the parameter settings in a subsequent iteration of the synthesis program. The analysis of the results, the creating of the combinations of parameter settings, and the running at the at least one synthesis job for each of the combinations of parameter settings are repeated until an exit criteria has been achieved.

21 Claims, 8 Drawing Sheets

(51) Int. Cl.
    *G06F 30/33* (2020.01)
    *G06F 30/327* (2020.01)

(56) References Cited

U.S. PATENT DOCUMENTS

| | | |
|---|---|---|
| 7,895,027 B2 | 2/2011 | Lin |
| 9,529,951 B2 | 12/2016 | Gristede |
| 9,619,602 B2 | 4/2017 | Liu |
| 9,703,920 B2 | 7/2017 | Berry |
| 9,910,949 B2 * | 3/2018 | Gristede ............... G06F 30/34 |
| 9,934,344 B2 * | 4/2018 | Liu ..................... G06F 30/398 |
| 10,002,221 B2 * | 6/2018 | Liu ..................... G06F 30/327 |
| 10,719,644 B2 | 7/2020 | Sharma |
| 10,726,182 B1 | 7/2020 | Deshpande |
| 2006/0015858 A1 | 1/2006 | Tanimoto |
| 2010/0162185 A1 * | 6/2010 | Thompson ............ G06F 30/30 |
| | | 716/132 |

OTHER PUBLICATIONS

M. Anwar et al., "Early Scenario Pruning for Efficient Design Space Exploration in Physical Synthesis," 2016 29th Int'l Conference on VLSI Design and 2016 15th Int'l Conference on Embedded Systems, pp. 116-121. (Year: 2016).*

M.M. Ziegler et al., "Scalable Auto-Tuning of Synthesis Parameters for Optimizing High-Performance Processors," ISLPED'16, 2016 ACM, 6 pages. (Year: 2016).*

M.M. Ziegler et al., "A Synthesis-Parameter Tuning System for Autonomous Design-Space Exploration," 2016 Design, Automation & Test in Europe Conference & Exhibition (DATE), pp. 1148-1151. (Year: 2016).*

M. M. Ziegler et al. "Machine learning techniques for taming the complexity of modern hardware design," IBM J. Res. & Dev., vol. 61, No. 4/5, Paper 13, Jul./Sep. 2017, 14 pages. (Year: 2017).*

Arcuri, Andrea, Fraser, Gordon, "Parameter Tuning or Default Values? An Empirical Investigation in Search-Based Software Engineering", Conference Paper, International Symposium on Search Based Software Engineering (SSBSE), 2011 (pp. 31).

* cited by examiner

METHODS AND SYSTEMS FOR LEVERAGING COMPUTER-AIDED DESIGN VARIABILITY IN SYNTHESIS TUNING

BACKGROUND OF THE INVENTION

Field of the Invention

The present invention relates in general to computing systems, and more particularly, to various embodiments for leveraging computer-aided design (CAD) tool variability in synthesis tuning.

Description of the Related Art

Computer-aided design (CAD) tools, or perhaps more specifically, advanced synthesis tools, place and route tools, etc., are often utilized to design complex systems and devices, such as very-large-scale integration (VLSI) circuits, such as processors. Even high-performance critical components that were conventionally implemented using custom design techniques (e.g., those based on schematic entry followed by placement and routing as opposed to synthesis which automates the design process beginning at the register-transfer level (RTL)) are now often synthesized using advanced synthesis tools.

Despite continuous improvement tool performance, products in competitive markets often set PPA (i.e., performance, power, area) targets beyond what the tools can natively deliver. These aggressive targets lead to circuit designers attempting to tune a vast number of design flow parameters in search of near-optimal design specific flow recipes.

Compounding the challenge of optimizing PPA for complex digital designs is the less frequently discussed issue of nondeterministic behaviors of some synthesis tools. Nondeterminism, which may be referred to as run-to-run variation, variability, noise, or chaos, is often the result of multithreading in CAD tools.

In a nondeterministic paradigm, comparing a single trial (or flow run) of a modified design flow against the baseline design flow trial may not be sufficient to judge the quality of results. In such instances, the designer may not be able to determine whether the result of the trial was due to skill or luck (i.e., whether or not the designer skillfully selected a good parameter setting, nondeterminism of the CAD tool(s) led to a better result, or some combination of both).

SUMMARY OF THE INVENTION

Various embodiments for tuning parameters to a synthesis program, by a processor, are provided. At least one set of parameter settings for the synthesis program is selected. A plurality of identical synthesis jobs for the at least one set of parameter settings is run in an iteration of the synthesis program. Results of the iteration of the synthesis program are analyzed utilizing a tuning optimization cost function. Combinations of the parameter settings are created based on the analysis of the results of the iteration. At least one synthesis job is run for each of the combinations of the parameter settings in a subsequent iteration of the synthesis program. The analysis of the results, the creating of the combinations of parameter settings, and the running at the at least one synthesis job for each of the combinations of parameter settings are repeated until an exit criteria has been achieved.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
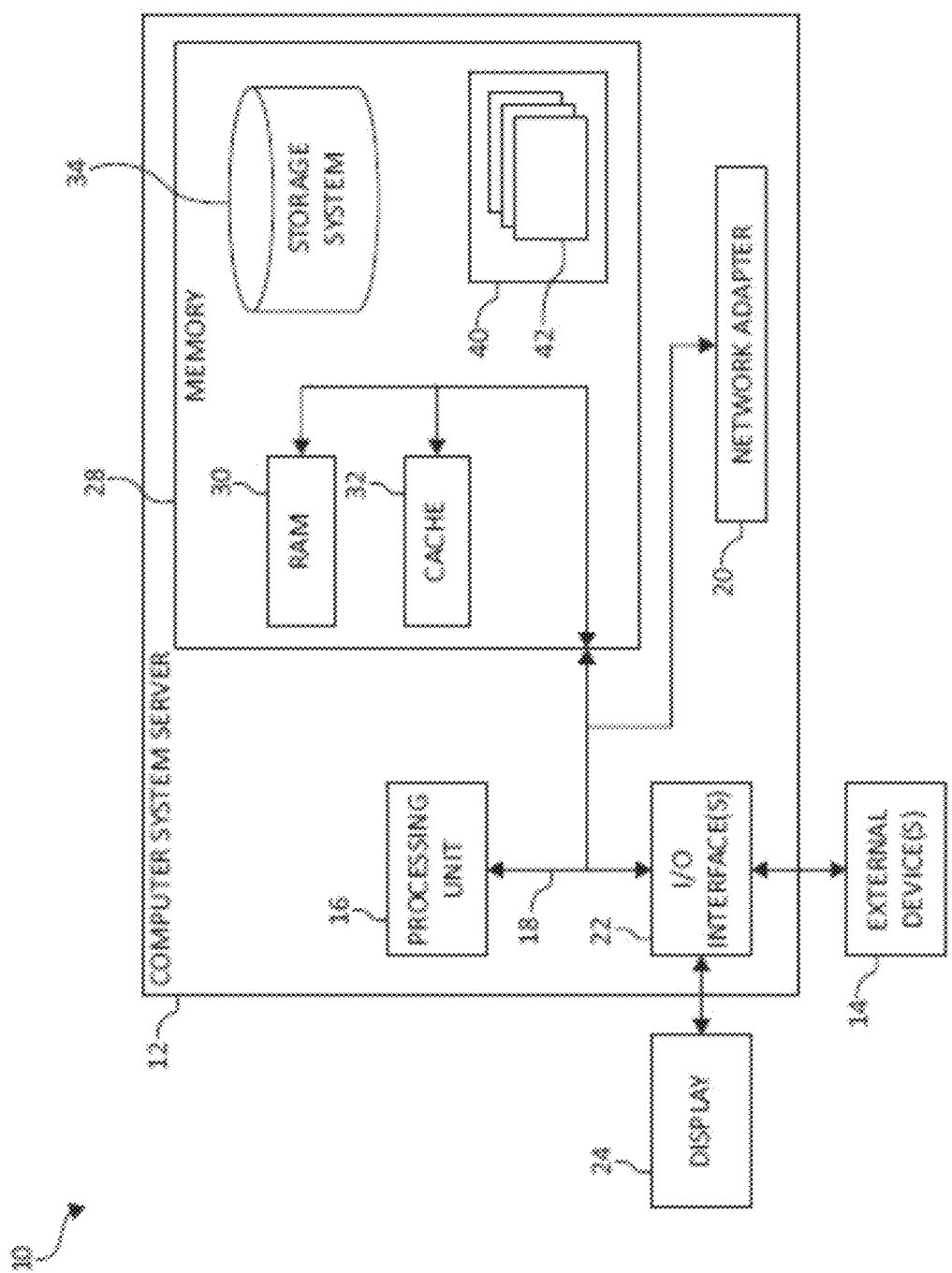
FIG. 1 is a block diagram depicting an exemplary computing node according to an embodiment of the present invention.

As discussed above, computer-aided design (CAD) tools, or perhaps more specifically, advanced synthesis tools, place and route tools, etc., are often utilized to design complex systems and devices, such as very-large-scale integration (VLSI) circuits. Even high-performance critical components that were conventionally implemented using custom design techniques (e.g., those based on schematic entry followed by placement and routing as opposed to synthesis which automates the design process beginning at the register-transfer level (RTL)) are now often synthesized using advanced synthesis tools.

Despite continuous improvement tool performance, products in competitive markets often set PPA (i.e., performance, power, area) targets beyond what the tools can natively deliver. These aggressive targets lead to circuit designers attempting to tune and customize a vast number of design flow parameters in search of near-optimal design specific flow recipes. The design flow tuning process is often tedious and is sometimes nonintuitive as there is often a vast parameter design space that may range in the order of thousands of tunable parameters.

Compounding the challenge of optimizing PPA for complex digital designs is the less frequently discussed issue of nondeterministic behaviors of some synthesis (and place & route) tools. Nondeterminism, which may be referred to as run-to-run variation, variability, noise, or chaos, is often the result of multi-threading in CAD tools. The effect of nondeterminism on PPA may vary quite a bit, depending on the tool and the design. In some instances, mostly Gaussian distributions with little variance manifest, while in others considerable variance is seen. Such effects may occur with respect to just one design metric (e.g., worst-case internal slack) but may also be present for many design metrics (e.g., area, power, and routing congestion).

In a nondeterministic paradigm, comparing a single trial (or flow run) of a modified design flow against the baseline design flow trial may not be sufficient to judge the quality of results. In such instances, the designer may not be able to determine whether the result of the trial was due to skill or luck (i.e., whether or not the designer skillfully selected a good parameter setting, nondeterminism of the CAD tool(s) led to a better result, or some combination of both).

In response to this issue, embodiments described herein provide a systematic methodology for parameter tuning in a nondeterministic design flow paradigm, which may be referred to as multi-phase positive nondeterministic tuning (PNT). That is, rather than trying to suppress nondeterminism, the methods and systems described herein leverage the potential improvement nondeterminism may provide. For example, in some embodiments, the methods and systems described herein in effect capture positive outliers (i.e., best observed trials) and then seeds additional parameter tuning trials using a multi-phase tuning approach. Although embodiments described herein mat refer to the use of the present systems and methods being utilized to design devices, such as VLSI circuits, it should be understood that the systems and methods may be applied to the use of any synthesis program to optimize or tune parameters for any type of system.

Conceptually, PNT may combine exploration of new tuning parameters with exploitation of multiple trials of the same parameter settings. When combined with a multi-phase tuning, PNT may effectively compound positive non-determinism by, for example, seeding later tuning phase trials with one or more of best observed trials from a prior tuning phase (or iteration).

With respect to the physical (or device) synthesis process in general, typically, multiple steps are involved. Earlier steps often include RTL compilation or logic synthesis, placement and early timing optimization, clock tree synthesis, and post-placement optimization with routing congestion estimates. The later steps may include routing, post-route optimization, and signoff, providing high-accuracy analysis and reports. Each step may have its own set of optional parameters that designers may be interested in evaluating and modifying. Designers often create recipes with a set of such optional parameters potentially tailored for individual designs (in particular for those with challenging PPA targets) based on their experience, supporting data, and/or trial and error experimentation. The topic of automated design flow parameter tuning has also been gaining interest, leading to tools and utilities to assist designers in the complex task of selecting parameter recipes for specific designs.

Often while designers are improving and optimizing a design, the physical synthesis flow is run up to the post-placement optimization step to keep the turnaround time for the construction phase within reasonable limits. Most design flows generate PPA metrics, and optionally early timing handoff abstractions, prior to proceeding to routing steps.

A parameter exploration process based on feedback from PPA metrics after post-placement optimization, with occasional affirmation from the post-tuning steps, may provide an appropriate balance between runtime and metric accuracy. For some industrial design flows, these iteration steps may allow a significant increase in exploration bandwidth, although other design flows may opt for different iteration points, depending on CAD tool runtime and accuracy tradeoffs.

Regarding CAD tool nondeterminism, driven by increases in high-performance design size and design closure complexity, physical synthesis tools increasingly rely on multi-threading or parallel processing techniques to rein in tool turnaround times. Depending on the type of implementation of multi-threading capability, one consequence is run-to-run variation or nondeterminism of quality of results. While nondeterminism is typically considered an undesirable behavior, it may be beneficial, as described herein. On one hand, nondeterminism may make the design closure process more challenging with variations late in the design cycle, disproportionate swings in results for incremental changes in design input data, and forcing designers to make multiple runs and pick best result at the cost of extra compute resources, etc. However, in accordance with one aspect of the methods and systems described herein, due to the inherent heuristic nature of the complex design optimization process with multiple objectives, run-to-run variation may also provide an opportunity to significantly improve overall quality of the results, especially when combined with multiple runs. The multiple runs from a nondeterministic design flow may create a distribution of PPA metrics, providing designers with a range of possible design points, rather than the single deterministic design point.

Conversely, multi-threading implementations that provide deterministic results may come at the cost of sacrificing more optimal results and possibly increasing turnaround time. In other words, stable results from a multi-threaded system may not necessarily lead to optimal quality. In essence, the distribution of design points from a nondeterministic system is collapsed to a single design point that is not necessarily the best.

To address these needs and/or the shortcomings in the prior art, in some embodiments described herein, methods and/or systems are disclosed that make use of nondeterminism by, for example, "running" each scenario (or set of parameter values or settings) multiple times (i.e., a plurality of identical runs are performed) perhaps in combination with a multiple-phase tuning process that utilizes (at least partial) runs from previous iterations (or phases) as "seeds" for the current iteration (or phase), perhaps such that only a subset of the steps are run in some phases, as described in greater detail below.

As a general framework that may be utilized by embodiments described herein, a compute framework may be provided that utilizes macro input data and a parameter space to search. The system launches an iteration consisting of multiple trials (or parameter combinations) run in parallel. The trials are monitored for completion, and upon completion of all trials, or if an iteration runtime limit is reached, a cost analysis is run based on the PPA metrics of all observed trials. Based on the cost analysis result a decision algorithm generates a new set of trials, and a new iteration is launched. This iterative process may continue until either the reaching the maximum number of iterations or a stopping (or exit) criterion (or criteria) is met. The methods and systems described herein may be considered to be a modification of such a system in which multiple identical runs are performed in each iteration and multiple phases may be performed (e.g., the utilization of seeds from previous phases).

In particular, in some embodiments, the methods and systems described herein utilize "forking" and multi-phase tuning in combination with a framework similar to that described above. As described in greater detail below, forking may refer to each scenario, set of parameters, or combination of parameter settings (or at least one of the scenarios) being run multiple times (e.g., during at least some of the iterations). In other words, in some embodiments, multiple (or more than one or a plurality of) identical runs are performed during at least one iteration (e.g., performed in parallel).

Multi-phase tuning may refer to the use of a previous tuning result as a "seed." That is, a result from an at least partially completed run, iteration, or phase may be utilized to begin a second phase of tuning, as is described in greater detail below. The methods and systems described herein may generate or determine the seeds in several different ways.

It should be understood that at least some of the aspects of functionality described herein may be performed utilizing a cognitive analysis (or AI, ML, etc.). The cognitive analysis may include natural language processing (NLP) and/or natural language understanding (NLU) or NLP/NLU technique, such classifying natural language, analyzing tone, and analyzing sentiment (e.g., scanning for keywords, key phrases, etc.) with respect to, for example, content (e.g., of a corpus) and communications sent to and/or received by users or entities and/or other available data sources. In some embodiments, Mel-frequency cepstral coefficients (MFCCs) (e.g., for audio content), and/or region-based convolutional neural network (R-CNN) pixel mapping (e.g., for object detection/classification and facial recognition in images/videos), as are commonly understood, are used.

The processes described herein may utilize various information or data sources associated with users, entities, computing devices/nodes, and/or the content of documents. The data sources may include any available information (or data) sources. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, input provided to an aaS platform and output received from an aaS platform. However, other data sources may also be utilized, such as communication sessions and/or the content (or communications) thereof (e.g., phone calls, video calls, text messaging, emails, in person/face-to-face conversations, etc.), a profile of (or basic information about) the user/entity (e.g., demographic information, job title, place of work, length of time at current position, family role, etc.), a schedule or calendar (i.e., the items listed thereon, time frames, etc.), projects (e.g., past, current, or future work-related projects, "to-do" lists, etc.), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, tailor the feedback to the individual user(s).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, tune parameters to a synthesis program, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

In particular, in some embodiments, a method for tuning parameters to a synthesis program, by a processor, is provided. At least one set of parameter settings for the synthesis program is selected. A plurality of identical synthesis jobs for the at least one set of parameter settings is run in an iteration of the synthesis program. Results of the iteration of the synthesis program are analyzed utilizing a tuning optimization cost function. Combinations of the parameter settings are created based on the analysis of the results of the iteration. At least one synthesis job for is run each of the combinations of the parameter settings in a subsequent iteration of the synthesis program. The analysis of the results, the creating of the combinations of parameter settings, and the running at the at least one synthesis job for each of the combinations of parameter settings are repeated until an exit criteria has been achieved.

The creating of the combinations of parameter settings based on the analysis of the results of the iteration may include selecting at least one of the plurality of identical synthesis jobs. The selecting of the at least one set of parameter settings for the synthesis program may be performed utilizing the tuning optimization cost function.

The number of the plurality of identical synthesis jobs for the at least one set of parameter settings may be at least one of based on historical macro synthesis data, based on a degree of variation of synthesis quality of result (QOR) statistics for a plurality of initial identical synthesis jobs, and dynamically updated based on intermediate results of the synthesis program.

Placement data associated with at least one of the plurality of identical synthesis jobs may be saved during the running of the plurality of identical synthesis jobs. The saved placement data may be utilized to perform at least one subsequent phase of the synthesis program. The at least one subsequent phase of the synthesis program may include running a plurality of identical synthesis jobs based on the saved placement data associated with the at least one of the plurality of identical synthesis jobs. Only a portion of the synthesis flow may be run during at least one of the at least one subsequent phases, and all portions of the synthesis flow may be run during at least a portion of the at least one subsequent phases. The saved placement data may be associated with at least one of latch locations, local clock buffer (LCB) locations, and initial un-fixed logic gate locations, all latch locations and the LCB locations, and a latch attractions file and a designated weight (which may indicate to the synthesis how closely to respect the recommended placement locations).

The running of the at least one synthesis job for each of the combinations of the parameter settings may include running a plurality of identical synthesis jobs for at least one of the combinations of the parameter settings. The synthesis program may a device (e.g., circuit) synthesis program, and the parameter settings may be device synthesis parameter settings that are implemented in manufacturing devices. The exit criteria may include at least one of a predetermined number of iterations being performed and an iteration failing to improve the results from at least one previous iteration.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in (and/or integrated into) vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
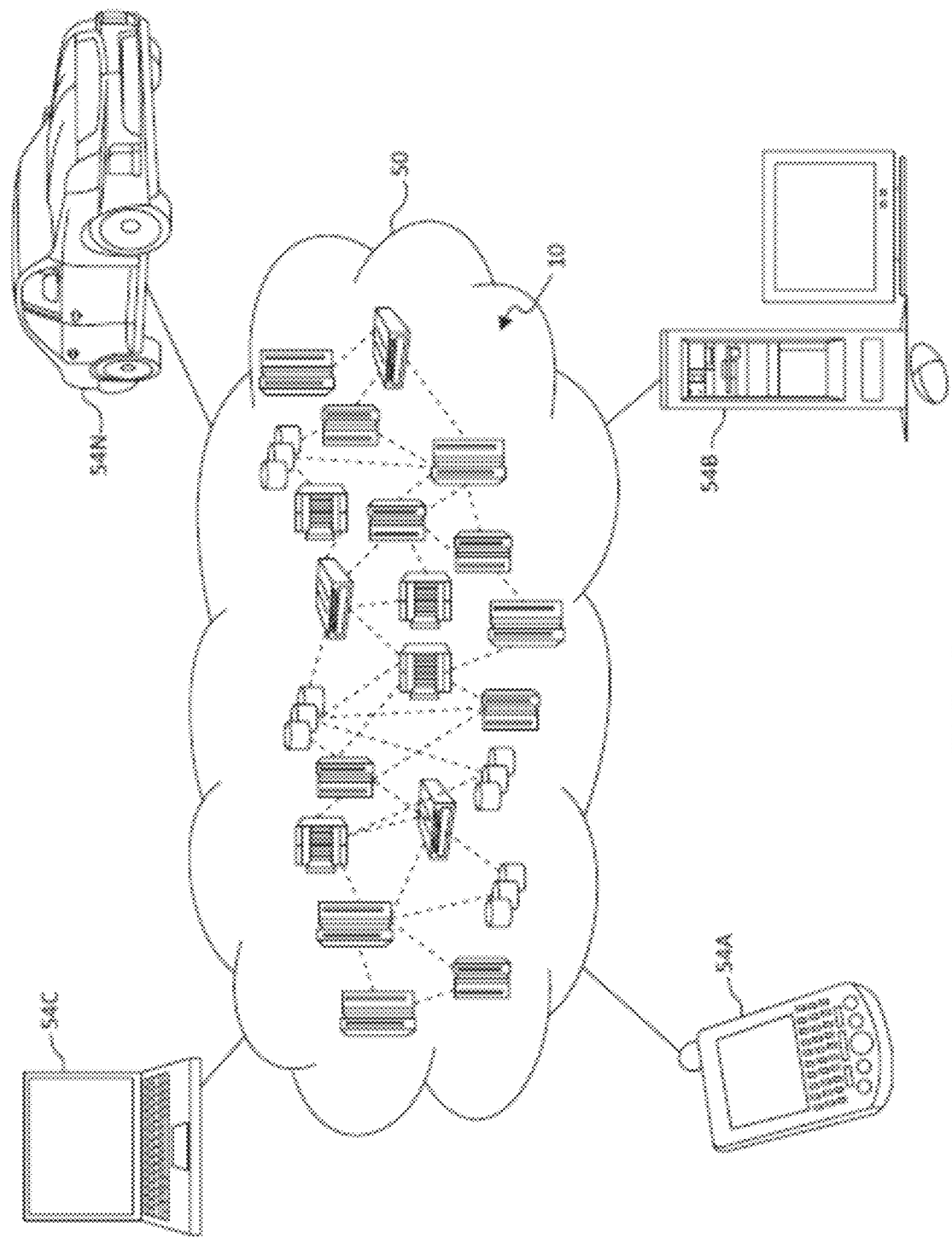
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
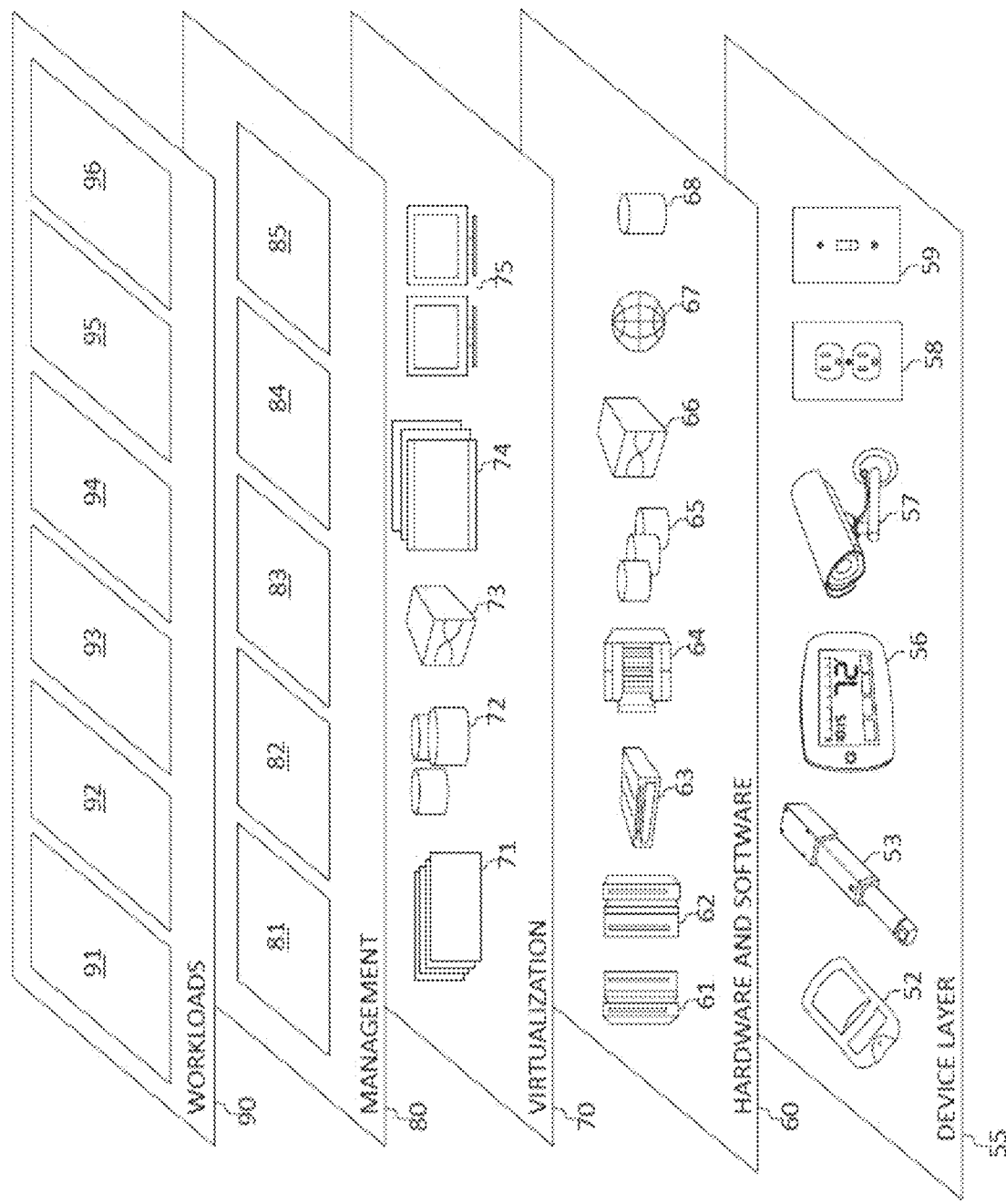
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for tuning parameters to a synthesis program, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
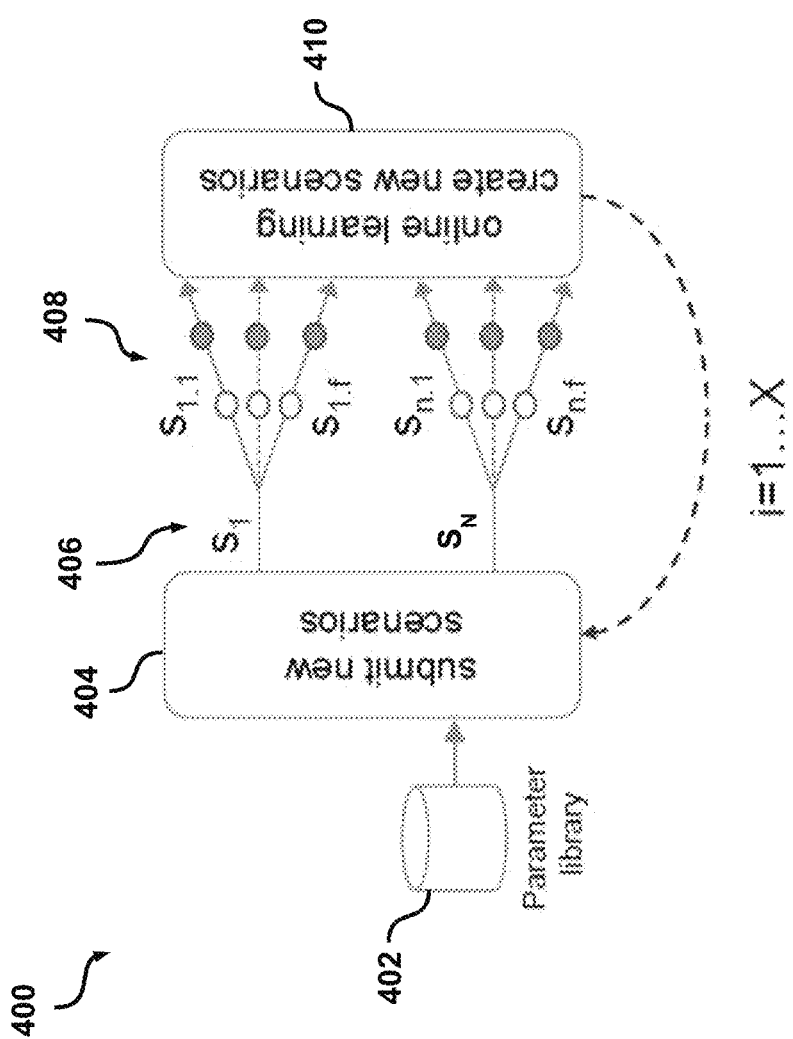
FIG. 4 is a block diagram of a system and/or method for tuning parameters to a synthesis program according to an embodiment of the present invention.

FIG. 4 illustrates a system (and/or method) 400 for tuning parameters (or input parameters) to a synthesis program according to some embodiments described herein. As shown, the system includes a parameter library 402. The parameter library 402 includes a plurality of various parameters, parameter settings (or "primitives"), etc. that may be utilized to design a device, such as a circuit (e.g., a VLSI circuit, such as a processor) and explored by the system to optimize the performance of the desired device. However, it should be understood that the systems and methods described herein may be utilized to a synthesis program for tuning the parameters of any type of system.

At block 404, and initial subset of parameters are selected from the parameter library 402 and utilized to form at least one set of parameters for synthesis jobs. In some embodiments, the selection of the sets of parameters may be based on standard synthesis input data for circuit level synthesis, such as a register transfer level (RTL) description, a physical abstract providing macro boundaries and pin locations, and timing assertions. Also, the selection of the parameters may be performed utilizing a set of "rules," which may describe the parameter settings or primitives, a cost function (or tuning optimization cost function) to be optimized, and perhaps other additional options.

In some embodiments, the goal of the utilization of the cost function is to rank trials (or runs or scenarios or parameter combinations/sets) from best to worst, perhaps based on a set of user defined metrics. As one example, the cost function may be $$\text{Cost} = \sum_{i=1}^{m} W_i \cdot \text{Norm}(M_i) \tag{1}$$

In Equation 1, $W_i$ is weight and $M_i$ is a particular metric. $\text{Norm}(M_i)$ is a normalization function, which may be referred to as a min-max scaling that scales values for the trials for the metric between 0 and 1. In some embodiments, the best observed metric value(s) is given a score of 0, and the worst value(s) is given a score of 1.

As shown, the system 400 then begins to run (e.g., in parallel) synthesis jobs for each of the sets of parameters or scenarios 406. In the example shown, two sets or scenarios 406 (i.e., $S_1$ and $S_N$) are shown. However, it should be understood that in some embodiments only one scenario is run, while significantly more (e.g., hundreds or more) may be run in others. Of particular interest in FIG. 4 is that, in accordance with some aspects of embodiments described herein, multiple identical synthesis jobs 408 are run of each (or at least one of) the scenarios 406. In particular, in the example shown in FIG. 4, scenario $S_1$ is run three times (i.e., $S_{1,1}, \ldots S_{1,f}$), as is scenario $S_N$ (i.e., $S_{n,1}, \ldots S_{n,f}$). In other words, in some embodiments described herein, at least some of the scenarios or synthesis jobs are run multiple (i.e., more than once) times during a single iteration of the tuning process. As mentioned above, this feature may be referred to as "forking."

Once all of the synthesis jobs have completed, or alternatively a large enough fraction of the synthesis jobs have completed (i.e., a user-specified percent of synthesis jobs, e.g., 90%) and/or a (predetermined) time limit, the results from the of the synthesis program are analyzed using a tuning optimization cost function (e.g., the same function utilized to select/generate the scenarios) at block 410. This process may be performed utilizing an online learning platform (e.g., a cognitive analysis performed remotely/via the cloud). The completion (or at least partial completion) of the synthesis jobs may complete an iteration (i.e., a first iteration), referenced by i in FIG. 4. If a particular iteration is not the first iteration, results from previous iterations may also be analyzed (i.e., together with the results from the currently completed iteration).

Also at block 410, the results from the iteration (perhaps combined with results form previous iterations) of the synthesis program are used to create combinations of the parameter settings for subsequent iterations, which may including selecting the "best" of the scenarios run in the current iteration. For example, the tuning optimization cost function may be used to rank the results (e.g., from a lowest cost (best result), to a highest cost (worst) result). Based on such a cost ranking of the results, the primitives/parameter settings corresponding to the top (predetermined) N cost ranked results may be placed in a survivor set. Additionally, in order to leverage the knowledge of experienced designers, the process may permit users/designers to influence which primitives/parameter settings are placed in the survivor set. For instance, a designer might know of a scenario (e.g., a combination of primitives/parameter settings) that performs well, but has not yet been put in the survivor set. The user/designer may be given the option to actively place that data in the survivor set. The new combinations and/or the survivor set(s) may then returned to block 404 of the system 400, where additional synthesis jobs are initiated in a manner similar to described above (perhaps with at least some of the scenarios being run multiple times) for the next (or subsequent iteration). This process may be repeated multiple times (e.g., X iterations).

In some embodiments, the process is continued until an exit criterion (or criteria) is met. More particularly, at block 410 (or another step/component not specifically shown) a determination may be made as to whether (or not) the exit criteria have been met. As one example, the exit criteria may be a predetermined (and perhaps user-configurable) number of iterations being performed. As another example, the exit criteria may be the most recent iterations failing to improve the results from one or more previous iterations and/or a performance goal being achieved. When such a criteria is met, the process may be ceased. The results may then be used to create a device, such as a VLSI circuit, perhaps after performing additional parameter tuning steps and post-tuning steps.

Figure 5:
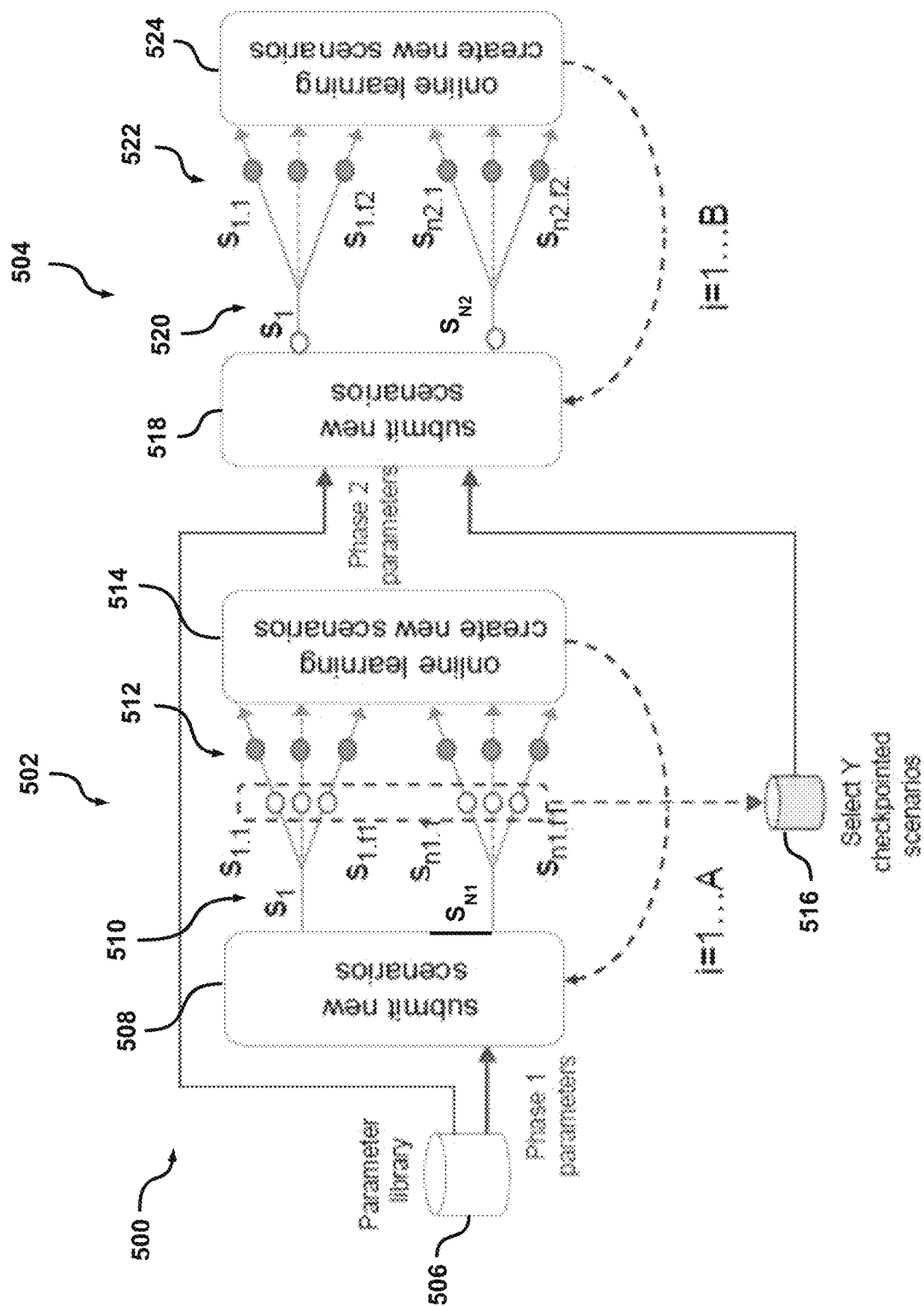
FIGS. 5-7 are block diagrams of multiple phase systems and/or method for tuning parameters to a synthesis program according to embodiments of the present invention.

FIG. 5 illustrates a system (and/or method) 500 for tuning parameters (or input parameters) to a synthesis program according to some embodiments described herein. In particular, the system 500 shown in FIG. 5 is a "two-phase" (or multi-phase or multi-portion or multi-segment) system/method, with a first phase 502 and a second phase 504, as described in greater detail below. The first phase 502 may be similar to the system/method 400 described above and shown in FIG. 4 (i.e., a single pass or single phase system). As such, the first phase 502 includes components/blocks/ steps 506, 508, 510, 512, and 514, which are similar to components/blocks/steps 402-410 in FIG. 4, and may operate in a similar manner. That is, the first phase 502 may perform parameter tuning via forking as described above and perform a number (e.g., A) of iterations.

However, in the first phase 502, data from partially complete runs are saved (or collected) during the tuning process. This data may be referred to as checkpoints (or checkpointed data, seeds, etc.) 516. As shown in FIG. 5, the checkpoints 516, along with parameters from the parameter library 506 of the first phase 502, are provided to block 518 of the second phase 504. At block 518, new sets of parameters are created using the checkpoints 516. The second phase 504 of the system 500 then begins to run (e.g., in parallel) synthesis jobs for each of the sets of parameters or scenarios 520 starting from the checkpoints saved in the first phase 502. In the example shown, two sets or scenarios 520 (i.e., $S_1$ and $S_{N2}$) are shown. However, it should be understood that in some embodiments only one scenario is run, while significantly more (e.g., hundreds or more) may be run in others. In the example shown, the second phase 504 utilizes forking such that multiple identical synthesis jobs 522 are run of each (or at least one of) the scenarios 520. In particular, in the example shown in FIG. 5, in the second phase 504, scenario $S_1$ is run three times (i.e., $S_{1.1}, \ldots S_{1.f2}$), as is scenario $S_{N2}$ (i.e., $S_{n2.1}, \ldots S_{n2.f2}$). This process may continue in a manner similar to that of system 400 in FIG. 4 and/or the first phase 502 in FIG. 5 through multiple iterations (e.g., B iterations) until an exit criteria is met.

In other words, in embodiments such as the example shown in FIG. 5, a checkpoint, complete with design placement information (or placement data), is generated after the desired flow step in the physical synthesis process, which may occur after the clock-tree-synthesis (CTS) step. Locations for all gates in the design may be saved from a previously good run. In this mode, the saved seed (or checkpoint) may be used for downstream tuning, and therefore includes both the register locations and the combinational gates. Any subsequent runs may need to read in the checkpointed information and start from this step in the flow. Earlier flow steps may not be able to be rerun, and no design changes may be allowed in prior flow steps. Such embodiments may be relatively stable and save significant run time by not rerunning earlier flow steps. However, any significant change in the design input data may make the checkpointed data unusable. This system and/or method may be referred to as (operating in) "checkpoint mode" (or PNT-CP).

Figure 6:
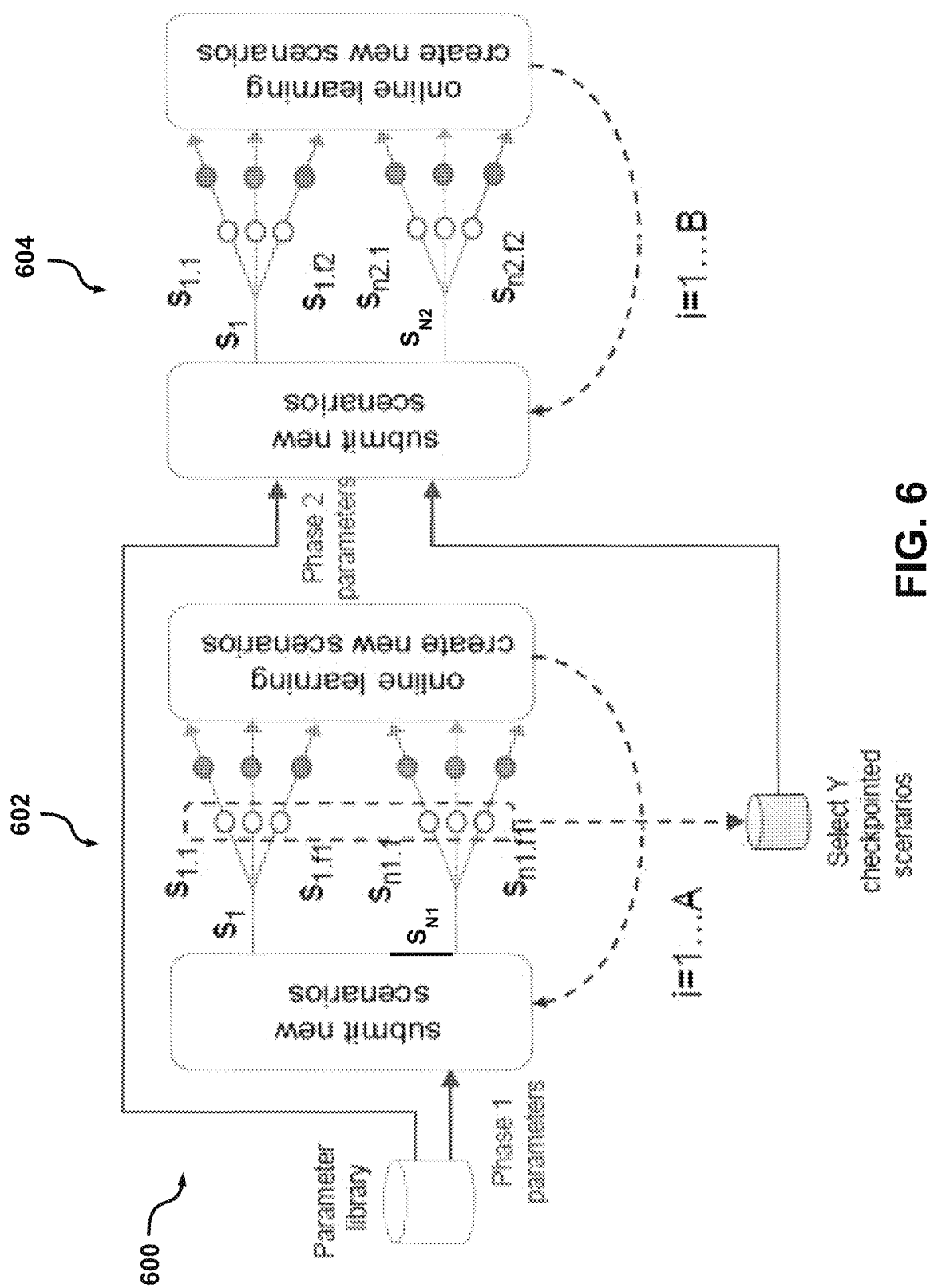

As another example, in some embodiments, the saved seed includes (e.g., only includes) the register locations along with the associated clock tree elements, such as clock buffers from a previous good run, and not the combinational gates. Such a system 600 is shown in FIG. 6, which includes a first phase 602 and a second phase 604. As shown in the second phase 604, subsequent reruns using this information may be started from the beginning of the flow. Such may be expected to place registers at the same exact locations as in the original run as well as recreate the exactly same clock tree that was implemented in the original run. While the combinational logic in the design is not explicitly constrained, their placement will be influenced significantly by the registers they are feeding into or fed by. This may also occur in the case of the register-attractions mode to a lesser extent, described below. In the preplace-mode, there may be more flexibility in terms of placement compared to the previously described checkpoint mode. Combinational gate changes may be allowed. However, changes to the registers and clock tree may cause issues, but these changes may not be strictly prohibited. This system and/or method may be referred to as (operating in) "register-preplace mode" (or PNT-PP).

Still referring to FIG. 6, as yet another example, in some embodiments, the saved seed includes (e.g., only includes) the register locations from a previously good run along with attraction weights that emphasize the degree to which such locations may be honored. Combinational gates may again not be saved. In a simple case, a global weight that is a multiple of the default weight that the placement process may use is specified. If necessary, this method may be extended to vary the weights by giving higher values for more critical registers and lower values for others, for example. One example of handling these locations/weights is as follows. The placement step may create a "dummy" net that is tethered to the desired location for the register and assigned the specified weight. This may encourage a typical placement process to attempt to place the registers close to the desired locations while optimizing the cost functions. In a typical system, placement may have the freedom to ignore or deviate from the requested locations in cases such as design rule violations or clustering of registers to form banks to be fed by a common clock buffer and so on. With this mode, the entire physical synthesis process may be rerun with the constraint of honoring the specified locations for registers, if they exist in the design. This system and/or method may be referred to as (operating in) "register-attraction mode" (or PNT-ATT). This mode may tolerate combinational changes to the original design as well as name changes and/or addition/deletion of a few registers. This mode may therefore be relatively flexible but may need to run from the beginning of the flow and thus have little if any runtime savings.

Figure 7:
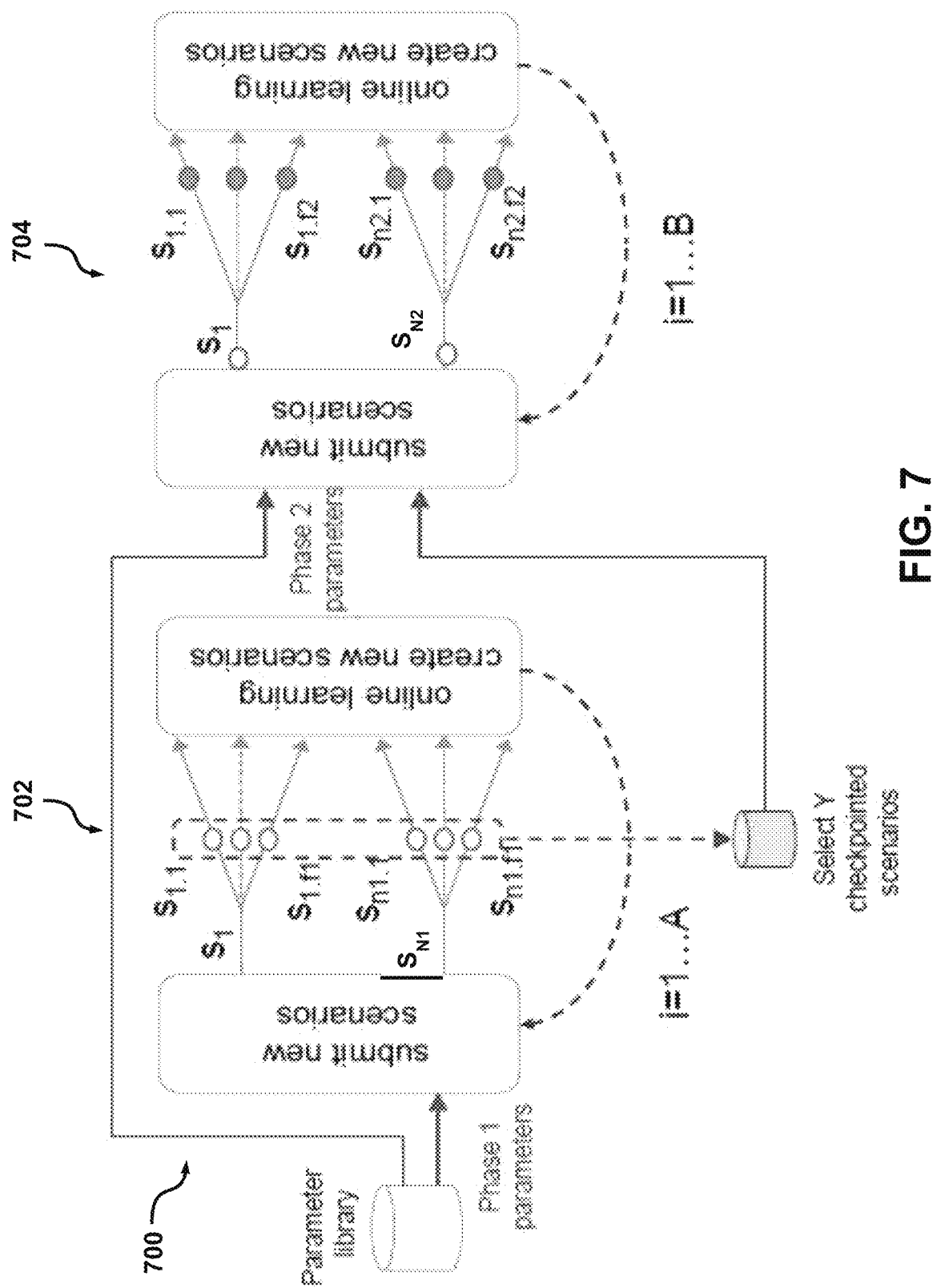

As a further example, in some embodiments utilizing multiple phases, the first phase only runs relatively earlier flow steps of the synthesis jobs such that the overall flow of both phases is essentially just one pass through the flow. An example of such is shown in FIG. 7 with system 700 that includes a first phase 702 and a second phase 704. As shown, the system 700 does not perform any steps in the first phase 702 after the checkpoints are saved, and the second phase begins its runs with the checkpointed data from the first phase 702. This system and/or method may be referred to as (operating in) "early-PNT mode" (ePNT) or "early estimation mode." Such embodiments may significantly reduce the turnaround time for the first phase with a potential moderate trade off in quality. In physical synthesis systems, post-placement optimization step execution times may dominate, especially when challenging PPA targets are specified. Over two-thirds of the total turnaround time for the parameter tuning steps may be spent during the post-placement optimization step chasing aggressive PPA targets. With the ePNT method, during the first phase, an attempt is made to judge the quality of candidate scenarios after the clock-tree-synthesis (CTS) step instead of waiting until the completion of the post-placement optimization step. A modified version of the cost function described above may be used where metrics, such as, congestion, area, and power, which seem to exhibit good correlation before/after post-placement optimization, are emphasized, while timing related metrics, which seem to vary significantly, are deemphasized. For example, if a first candidate scenario has better congestion metrics compared to second candidate scenario, right after CTS then that relationship typically seems to hold after the post-placement optimization step. As a result of this change, the first phase trials may proceed much faster and the forking process may amplify this benefit even more.

In some embodiments, the number of identical synthesis jobs performing (or the number of forks) may vary between scenarios. This concept may be referred to as "variable forking." The number of forks per scenario may be determined based on offline historical data about the scenario variability and the macro variability and/or offline data observed from the current run in progress (i.e., dynamic forking).

As such, in some embodiments, the number of forks may be determined utilizing a fixed method, a variable method, and an adaptive method. In the fixed method, the same number of forks (or identical synthesis jobs) is performed for each scenario. In the variable method, the number of forks is determined based on historical data, which may include an archive of scenario variability across all designs. In the adaptive method, the number of forks is determined "on-the-fly" based on characteristics of the run. Also, in some embodiments, the tuning may be performed in one phase (e.g., FIG. 4), while in others two (or more) phases may be utilized, as described above (e.g., FIGS. 5-7).

In some embodiments, a macro synthesis tuning method is provided that that comprises an iterative logic synthesis tuning that is supplemented by a selectable number of identical runs within each iteration. The best of the identical runs may be selected for further participation within the tuning algorithm. A cost function may be used to select the best of the identical runs.

The number of identical runs may be based on historical macro synthesis data or based on the degree of variation of synthesis quality of result (QOR) stats as measured by an initial round of multiple identical synthesis runs. A ranking method may be used to measure the degree of variation of the QOR stats in the initial round of synthesis runs. A translation method may be used to translate the rank into a number (e.g., the number being the number of identical runs to be used in subsequent iterations). The number of identical runs may be dynamically updated based on the intermediate results of the logic synthesis tuning algorithm.

The design flow is divided into two (or more) major segments (or phases). Saved placement data from the best result from the first segment may be used to perform iterative synthesis tuning of the second segment of the design flow. The placement data may include fixed latch and LCB locations and/or initial un-fixed placements of the logic gates. The placement data may include latch locations with an "attractions weight" to more flexibly guide the synthesis placing algorithm toward the latch (x,y) locations of the best result from the first segment.

Saved placement data from a previous "golden" synthesis run for the entire flow may be utilized. The placement data may include fixed latch and LCB locations. The placement data may include latch locations with an "attractions weight" to more flexibly guide the synthesis placing algorithm toward the latch (x,y) locations of the "golden" synthesis run.

Figure 8:
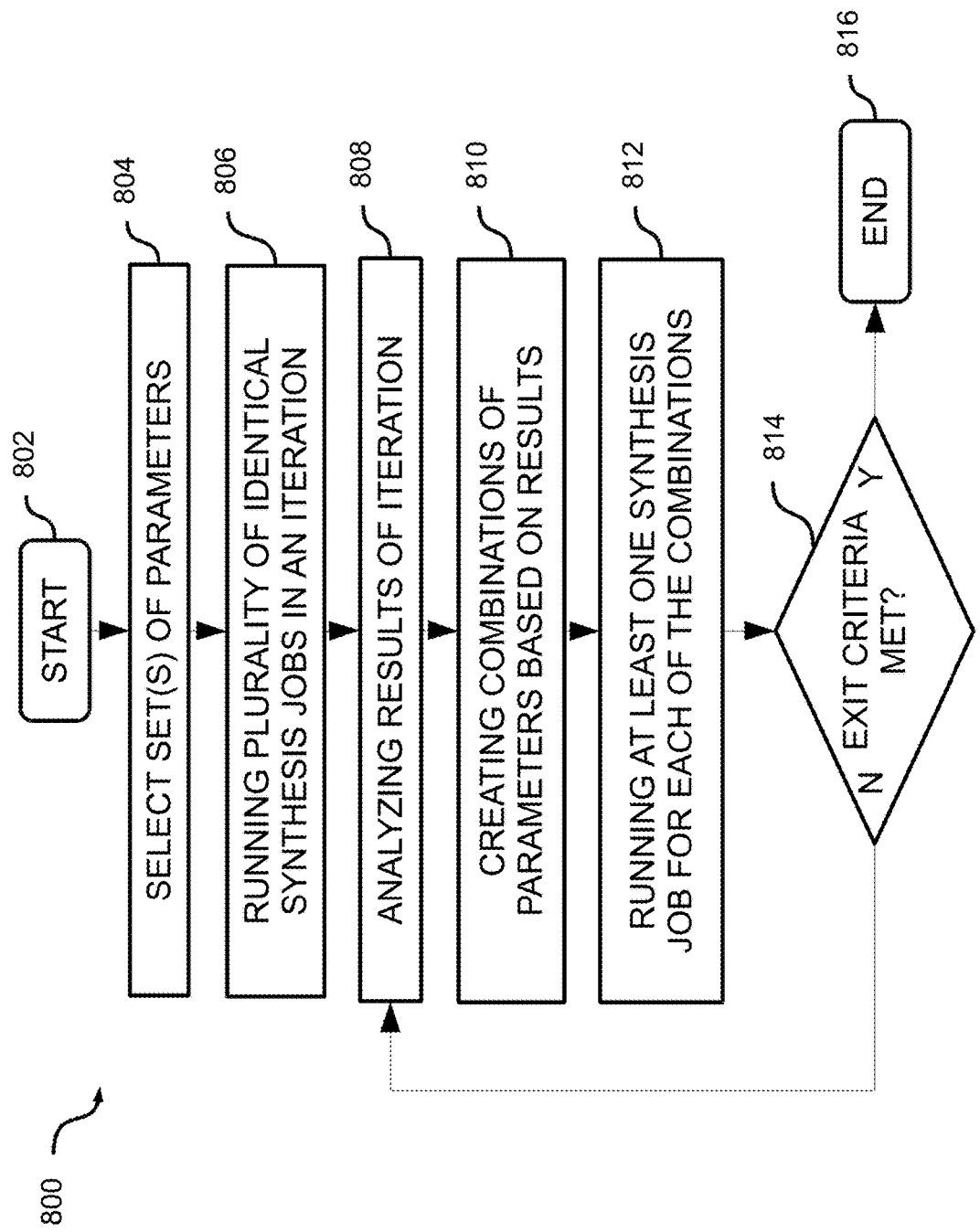
FIG. 8 is a flowchart diagram of an exemplary method for tuning parameters to a synthesis program according to an embodiment of the present invention.

Turning to FIG. 8, a flowchart diagram of an exemplary method 800 for tuning parameters to a synthesis program, by a processor, is provided. The method 800 begins (step 802) with, for example, a plurality parameters/parameter settings and any desirable rules, etc. to be used in the synthesis program being collected.

At least one set of parameter settings for the synthesis program is selected (step 804). The selecting of the at least one set of parameter settings for the synthesis program may be performed utilizing a tuning optimization cost function. The synthesis program may a device (e.g., circuit) synthesis program, and the parameter settings may be device synthesis parameter settings that are implemented in manufacturing devices.

A plurality of identical synthesis jobs for the at least one set of parameter settings is run in an iteration of the synthesis program (step 806). The number of the plurality of identical synthesis jobs for the at least one set of parameter settings may be at least one of based on historical macro synthesis data, based on a degree of variation of synthesis quality of result (QOR) statistics for a plurality of initial identical synthesis jobs, and dynamically updated based on intermediate results of the synthesis program.

Results of the iteration of the synthesis program are analyzed utilizing a tuning optimization cost function (step 808). The function utilized to analyze the results may be the same function utilized to select the at least one set of parameter settings.

Combinations of the parameter settings are created based on the analysis of the results of the iteration (step 810). The creating of the combinations of parameter settings based on the analysis of the results of the iteration may include selecting at least one of the plurality of identical synthesis jobs.

At least one synthesis job for is run each of the combinations of the parameter settings in a subsequent iteration of the synthesis program (step 812). The running of the at least one synthesis job for each of the combinations of the parameter settings may include running a plurality of identical synthesis jobs for at least one of the combinations of the parameter settings.

Placement data associated with at least one of the plurality of identical synthesis jobs may be saved during the running of the plurality of identical synthesis jobs. The saved placement data may be utilized to perform at least one subsequent (e.g., a second, third, etc.) phase of the synthesis program. The at least one subsequent phase of the synthesis program may include running a plurality of identical synthesis jobs based on the saved placement data associated with the at least one of the plurality of identical synthesis jobs. Only a portion of the synthesis flow may be run during at least one of the at least one subsequent phases, and all portions of the synthesis flow may be run during at least a portion of the at least one subsequent phases. The saved placement data may be associated with at least one of latch locations, local clock buffer (LCB) locations, and initial un-fixed logic gate locations, all latch locations and the LCB locations, and a latch attractions file and a designated weight (which may indicate to the synthesis how closely to respect the recommended placement locations).

The analysis of the results, the creating of the combinations of parameter settings, and the running at the at least one synthesis job for each of the combinations of parameter settings are repeated until an exit criteria has been achieved (step 814). The exit criteria may include at least one of a predetermined number of iterations being performed and an iteration failing to improve the results from at least one previous iteration.

Method 800 ends (step 816) with, for example, the exit criteria being met. The design may then undergo additional steps and be utilized to create a device, such as a VLSI circuit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for tuning parameters to a synthesis program, by a processor, comprising:
    selecting at least one set of parameter settings for the synthesis program;
    running a plurality of identical synthesis jobs for the at least one set of parameter settings in an iteration of the synthesis program;
    analyzing results of the iteration of the synthesis program utilizing a tuning optimization cost function;
    creating combinations of the parameter settings based on said analysis of the results of the iteration;
    running at least one synthesis job for each of the combinations of the parameter settings in a subsequent iteration of the synthesis program; and
    repeating said analysis of the results, the creating of the combinations of parameter settings, and the running at the at least one synthesis job for each of the combinations of parameter settings until an exit criteria has been achieved.

2. The method of claim 1, wherein the creating of the combinations of parameter settings based on said analysis of the results of the iteration includes selecting at least one of the plurality of identical synthesis jobs, and wherein the selecting of the at least one set of parameter settings for the synthesis program is performed utilizing the tuning optimization cost function.

3. The method of claim 1, wherein the number of the plurality of identical synthesis jobs for the at least one set of parameter settings is at least one of based on historical macro synthesis data, based on a degree of variation of synthesis quality of result (QOR) statistics for a plurality of initial identical synthesis jobs, and dynamically updated based on intermediate results of the synthesis program.

4. The method of claim 1, further comprising:
    saving placement data associated with at least one of the plurality of identical synthesis jobs during the running of the plurality of identical synthesis jobs; and
    utilizing the saved placement data to perform at least one subsequent phase of the synthesis program, wherein the at least one subsequent phase of the synthesis program includes running a plurality of identical synthesis jobs based on the saved placement data associated with the at least one of the plurality of identical synthesis jobs.

5. The method of claim 4, wherein only a portion of a synthesis flow is run during at least one phase, and all portions of the synthesis flow are run during cumulative phases.

6. The method of claim 4, wherein the saved placement data is associated with at least one of latch locations, local clock buffer (LCB) locations, and initial un-fixed logic gate locations, all latch locations and the LCB locations, and a latch attractions file and a designated weight.

7. The method of claim 1, wherein the running of the at least one synthesis job for each of the combinations of the parameter settings includes running a plurality of identical synthesis jobs for at least one of the combinations of the parameter settings.

8. A system for tuning parameters to a synthesis program comprising:
    a processor executing instructions stored in a memory device, wherein the processor:
        selects at least one set of parameter settings for the synthesis program;
        runs a plurality of identical synthesis jobs for the at least one set of parameter settings in an iteration of the synthesis program;
        analyzes results of the iteration of the synthesis program utilizing a tuning optimization cost function;
        creates combinations of the parameter settings based on said analysis of the results of the iteration;
        runs at least one synthesis job for each of the combinations of the parameter settings in a subsequent iteration of the synthesis program; and
        repeats said analysis of the results, the creating of the combinations of parameter settings, and the running at the at least one synthesis job for each of the combinations of parameter settings until an exit criteria has been achieved.

9. The system of claim 8, wherein the creating of the combinations of parameter settings based on said analysis of the results of the iteration includes selecting at least one of the plurality of identical synthesis jobs, and wherein the selecting of the at least one set of parameter settings for the synthesis program is performed utilizing the tuning optimization cost function.

10. The system of claim 8, wherein the number of the plurality of identical synthesis jobs for the at least one set of parameter settings is at least one of based on historical macro synthesis data, based on a degree of variation of synthesis quality of result (QOR) statistics for a plurality of initial identical synthesis jobs, and dynamically updated based on intermediate results of the synthesis program.

11. The system of claim 8, wherein the processor further:
saves placement data associated with at least one of the plurality of identical synthesis jobs during the running of the plurality of identical synthesis jobs; and
utilizes the saved placement data to perform at least one subsequent phase of the synthesis program, wherein the at least one subsequent phase of the synthesis program includes running a plurality of identical synthesis jobs based on the saved placement data associated with the at least one of the plurality of identical synthesis jobs.

12. The system of claim 11, wherein the saved placement data is associated with at least one of latch locations, local clock buffer (LCB) locations, and initial un-fixed logic gate locations, all latch locations and the LCB locations, and a latch attractions file and a designated weight.

13. The system of claim 8, wherein only a portion of a synthesis flow is run during at least one phase, and all portions of the synthesis flow are run during cumulative phases.

14. The system of claim 8, wherein the running of the at least one synthesis job for each of the combinations of the parameter settings includes running a plurality of identical synthesis jobs for at least one of the combinations of the parameter settings.

15. A computer program product for tuning parameters to a synthesis program, by a processor, the computer program product embodied on a non-transitory computer-readable storage medium having computer-readable program code portions stored therein, the computer-readable program code portions comprising:
an executable portion that selects at least one set of parameter settings for the synthesis program;
an executable portion that runs a plurality of identical synthesis jobs for the at least one set of parameter settings in an iteration of the synthesis program;
an executable portion that analyzes results of the iteration of the synthesis program utilizing a tuning optimization cost function;
an executable portion that creates combinations of the parameter settings based on said analysis of the results of the iteration;
an executable portion that runs at least one synthesis job for each of the combinations of the parameter settings in a subsequent iteration of the synthesis program; and
an executable portion that repeats said analysis of the results, the creating of the combinations of parameter settings, and the running at the at least one synthesis job for each of the combinations of parameter settings until an exit criteria has been achieved.

16. The computer program product of claim 15, wherein the creating of the combinations of parameter settings based on said analysis of the results of the iteration includes selecting at least one of the plurality of identical synthesis jobs, and wherein the selecting of the at least one set of parameter settings for the synthesis program is performed utilizing the tuning optimization cost function.

17. The computer program product of claim 15, wherein the number of the plurality of identical synthesis jobs for the at least one set of parameter settings is at least one of based on historical macro synthesis data, based on a degree of variation of synthesis quality of result (QOR) statistics for a plurality of initial identical synthesis jobs, and dynamically updated based on intermediate results of the synthesis program.

18. The computer program product of claim 15, wherein the computer-readable program code portions further include:
an executable portion that saves placement data associated with at least one of the plurality of identical synthesis jobs during the running of the plurality of identical synthesis jobs; and
an executable portion that utilizes the saved placement data to perform at least one subsequent phase of the synthesis program, wherein the at least one subsequent phase of the synthesis program includes running a plurality of identical synthesis jobs based on the saved placement data associated with the at least one of the plurality of identical synthesis jobs.

19. The computer program product of claim 18, wherein the saved placement data is associated with at least one of latch locations, local clock buffer (LCB) locations, attraction, and initial un-fixed logic gate locations, all latch locations and the LCB locations, and a latch attractions file and a designated weight.

20. The computer program product of claim 15, wherein only a portion of a synthesis flow is run during at least one phase, and all portions of the synthesis flow are run during cumulative phases.

21. The computer program product of claim 15, wherein the running of the at least one synthesis job for each of the combinations of the parameter settings includes running a plurality of identical synthesis jobs for at least one of the combinations of the parameter settings.

* * * * *